United States Patent
Jansen (10) Patent No.: US 7,205,752 B2
(45) Date of Patent: Apr. 17, 2007

(54) MASTER-SLAVE CRITICAL CONDUCTION MODE POWER CONVERTER

(75) Inventor: Arian Jansen, Lake Forest, CA (US)

(73) Assignee: Flextronics AP, LLC, Broomfield, CO (US)

( * ) Notice: Subject to any disclaimer, the term of this patent is extended or adjusted under 35 U.S.C. 154(b) by 0 days.

(21) Appl. No.: 11/220,876

(22) Filed: Sep. 6, 2005

(65) Prior Publication Data

US 2006/0077604 A1 Apr. 13, 2006

Related U.S. Application Data

(60) Provisional application No. 60/609,508, filed on Sep. 7, 2004, now abandoned.

(51) Int. Cl.
*G05F 1/40* (2006.01)
(52) U.S. Cl. .................................... 323/272
(58) Field of Classification Search ............... 323/272, 323/271, 224
See application file for complete search history.

(56) References Cited

U.S. PATENT DOCUMENTS

| | | | |
|---|---|---|---|
| 5,565,761 A | 10/1996 | Hwang | |
| 5,592,128 A | 1/1997 | Hwang | |
| 5,742,151 A | 4/1998 | Hwang | |
| 5,747,977 A | 5/1998 | Hwang | |
| 5,804,950 A | 9/1998 | Hwang et al. | |
| 5,905,369 A * | 5/1999 | Ishii et al. | 323/272 |
| 6,091,233 A | 7/2000 | Hwang et al. | |
| 6,160,725 A | 12/2000 | Jansen | |
| 6,469,914 B1 | 10/2002 | Hwang et al. | |
| 6,483,281 B2 | 11/2002 | Hwang | |
| 6,531,854 B2 | 3/2003 | Hwang | |
| 6,541,944 B2 | 4/2003 | Hwang | |
| 6,605,930 B2 | 8/2003 | Hwang | |
| 6,657,417 B1 | 12/2003 | Hwang | |
| 6,674,272 B2 | 1/2004 | Hwang | |

* cited by examiner

*Primary Examiner*—Shawn Riley
(74) *Attorney, Agent, or Firm*—Haverstock & Owens LLP (57) ABSTRACT

A system and a method for to use multiple power sources for supplying power to a load. The system and method use a triggering system to automatically and substantially cancel a ripple component of the input current drawn by the system. A master power source and a slave power source supply power to the load. The triggering system results in the two power sources having switching frequencies that are substantially equal and switching cycles that are substantially 180° out of phase. Further, the method and the device contemplate the use of a local oscillator in the triggering system to ensure that the slave power source is triggered to the on position at a point in the switching cycle of the master power source that is approximately 180° out of phase with a leading edge of the master switching drive signal. The system and method are advantageously used to provide a power factor correction front-end for a switch-mode power supply. Power supplies with a diverse array of relationships between power supplied and switching frequency can be used.

28 Claims, 7 Drawing Sheets

(Prior Art)

Fig. 7

(Prior Art)

US 7,205,752 B2

MASTER-SLAVE CRITICAL CONDUCTION MODE POWER CONVERTER

RELATED APPLICATIONS

This application claims priority under 35 U.S.C. § 119(e) of the now abandoned, U.S. provisional application Ser. No. 60/609,508 filed on Sep. 7, 2004 and entitled "MASTER SLAVE CRITICAL CONDUCTION MODE POWER CONVERTOR," which is hereby incorporated by reference in its entirety.

FIELD OF THE INVENTION

The present invention relates generally to systems for supplying power to a load and, in particular, to such systems that use plural power sources to create high output, homogenous power.

BACKGROUND OF THE ART

Several issues arise in the construction of power converters. The most problematic of these is the difficulty of creating noise-free output power without introducing noise into the input power. Conventional techniques directed toward this problem are well known, but complicated and expensive to implement. Conventional power converters introduce periodically varying components of the input current and can cause power loss. In addition, prior art power converters typically do not appear as a simple resistive load to the power input.

Figure 5:
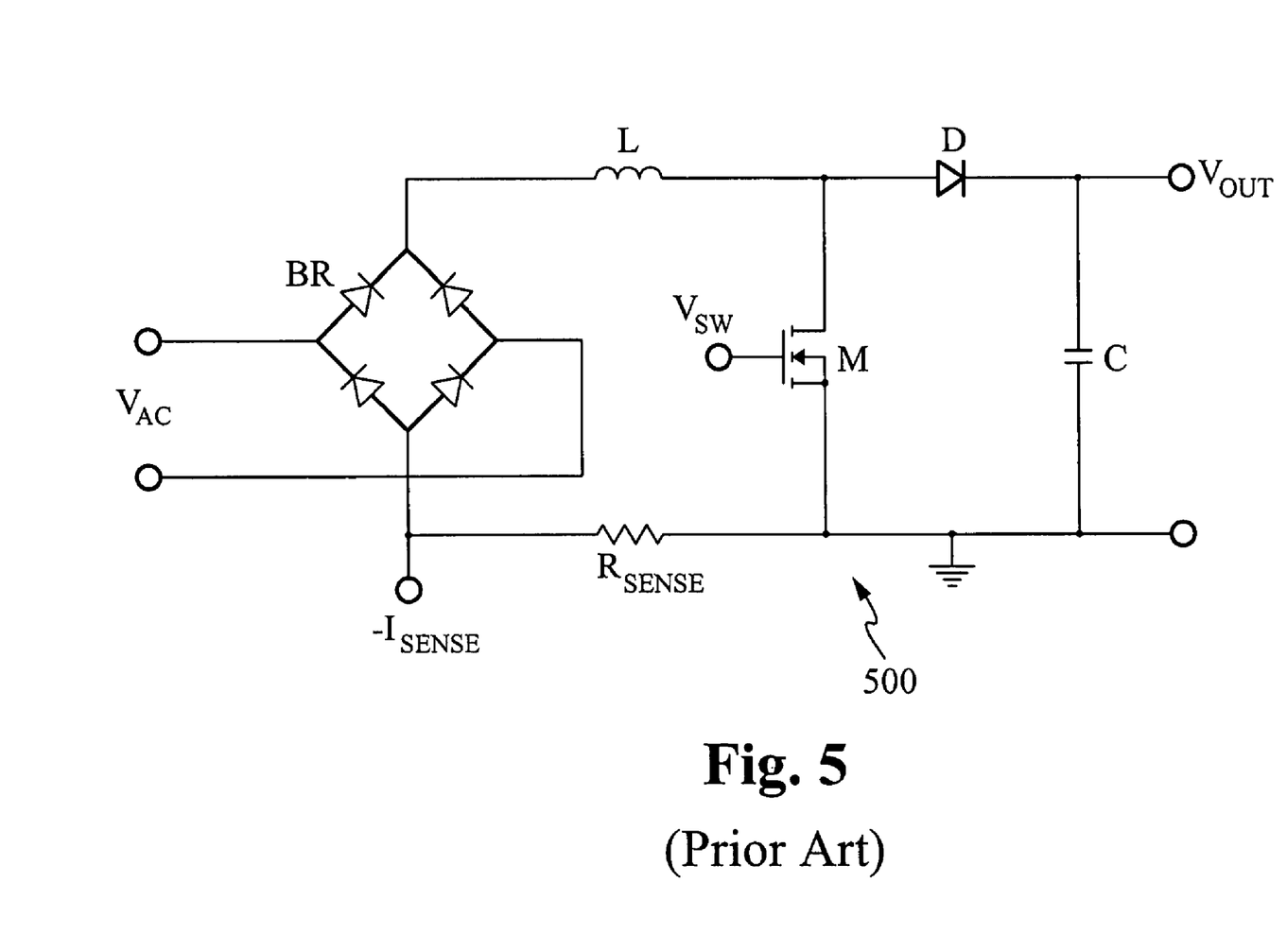
FIG. 5 shows a prior art power source.

Prior art designs for boost converters for power factor correction (PFC), comprise two conventional approaches to the problem of minimizing ripple current. FIG. 5. illustrates a schematic diagram of a prior art power factor correction (PFC) boost converter 500. The two approaches for a system similar to that of FIG. 5 are discontinuous mode (DM) and continuous mode (CM).

In the converter 500 an alternating-current (AC) voltage supply $V_{AC}$ is coupled across input terminals of a full-wave bridge rectifier BR. A first output terminal of the bridge rectifier BR is coupled to a first terminal of an inductor L. A second terminal of the inductor L is coupled to a drain of a transistor switch M and to an anode of a diode D. A cathode of the diode D is coupled to a first terminal of an output capacitor C. A second output terminal of the bridge rectifier BR is coupled to a first terminal of a sensing resistor $R_{SENSE}$. A second terminal of the sensing resistor $R_{SENSE}$, a source of the transistor switch M and a second terminal of the capacitor C are each coupled to a ground node. A voltage signal $-I_{SENSE}$ formed at the first terminal of the sensing resistor $R_{SENSE}$ is representative of current drawn by the boost converter 500 from the supply $V_{AC}$. The signal $-I_{SENSE}$ is negative in polarity because it is formed by a voltage drop across the resistor $R_{SENSE}$ referenced to ground. A switch control voltage signal $V_{SW}$ is applied to the gate of the transistor switch M and controls whether the transistor switch M is conductive (switch closed) or non-conductive (switch open).

When the switch M is closed, a current flows from the bridge rectifier BR through the inductor L and through the switch M. Under such conditions, the diode D is reverse-biased by the output voltage $V_{OUT}$. Current flowing through the inductor L stores energy as a magnetic field associated with the inductor L. When the switch M is opened, the stored energy is transferred to the output capacitor C by a current which flows through the diode D. Under such conditions, the diode D is forward-biased. The energy stored in the output capacitor C forms the output voltage $V_{OUT}$ across the capacitor C which is available for driving a load, such as a second power supply stage. A rate of energy transfer from the source $V_{AC}$ to the capacitor C depends upon a duty cycle of the switch control signal $V_{SW}$.

The boost converter 500 illustrated in FIG. 5 controls the times at which switching of the transistor switch M occurs such that the current draws from the alternating-current supply $V_{AC}$ by the boost converter 500 is substantially in phase with the voltage provided by the supply $V_{AC}$ and to control the duty cycle of the transistor switch M such that the output voltage $V_{OUT}$ is maintained at a constant level. The voltage $V_{OUT}$ and the voltage $-I_{SENSE}$ are both monitored for controlling switching.

When such a boost converter 500 is operated in CM, the current flowing through the inductor L remains above zero at all times. Thus, at the instant of closure of the switch M, current is flowing through the diode D. Energy stored in the junction associated with the diode D results in a finite recovery time for the diode D such that the diode D does not turn off instantaneously. Rather, energy stored in the junction of the diode D is discharged through the switch M upon its closure. A resulting high level of current in the switch M can cause excessive power dissipation and premature failure of the switch M. Because this high level of current occurs each time the switch M is cycled, the switching frequency is limited. This is especially true for boost converters which drive a second power supply stage because such boost converters typically generate a regulated voltage of approximately 400 volts across the output capacitor C. Further, because the PFC boost converter 500 controls the times at which switching occurs such that the voltage and current provided by the supply $V_{AC}$ are in phase with each other, this problem of elevated current in the switch M cannot conventionally be avoided by allowing the current in the diode D to fall to zero prior to closing the switch M as would occur if the converter 500 were operated DM.

When operating in DM, the converter 500 typically exaggerates the ripple allowing the current through L to drop to a minimum of zero, while simultaneously raising the maximum current value. This extension of the range of allowed current values for DM converters means the average value of the current in L remains constant regardless of the mode of operation. While this preservation of current allows a converter to attain both less lossy switching and improved efficiency over a CM converter, it unfortunately introduces high ripple into both input and output current.

Figure 6:
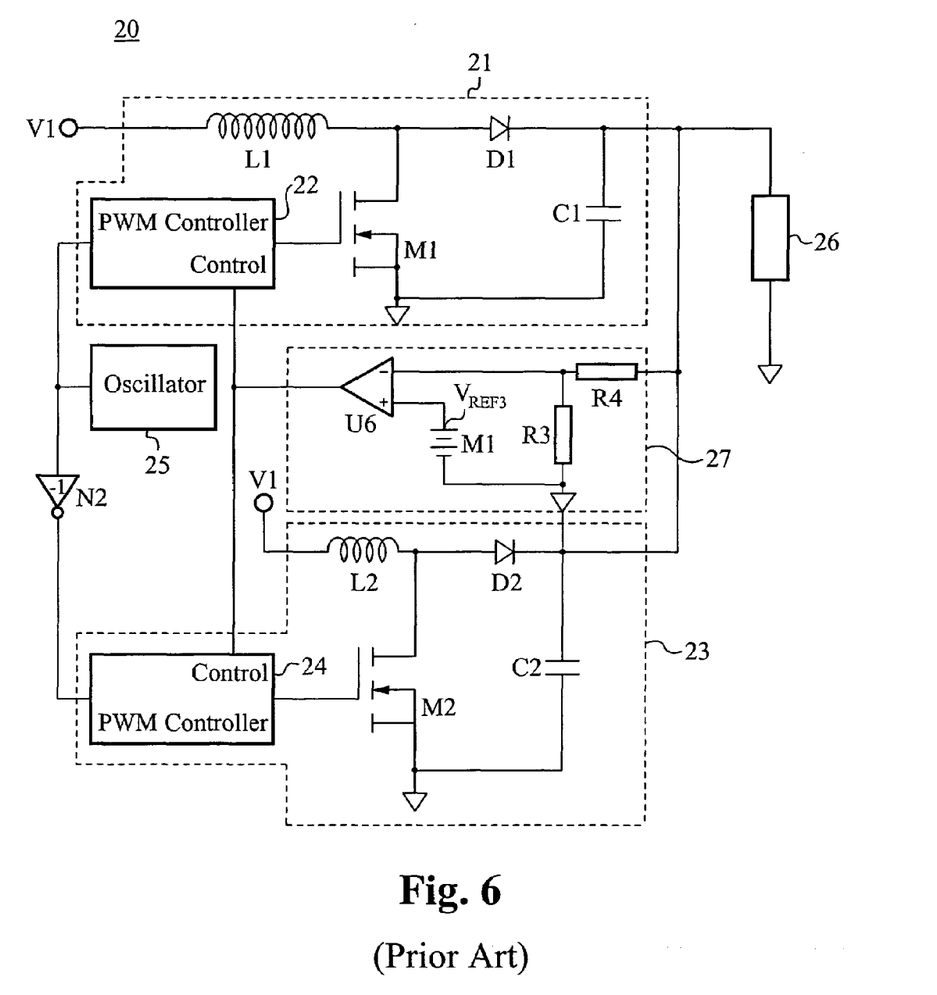
FIG. 6 shows a prior art power supply front-end for power factor correction using two parallel power sources

Prior art systems have attempted to reduce the ripple effects by using multiple converters of the above design, modifying their relative phases, and combining their output power. The phase of each converter is modified relative to the other converters such that the ripple components of the converters cancel one another out. Such a device is illustrated in FIG. 6.

It is known to cancel the input ripple current drawn by a system in order to power a load. It is known in the art to effect input ripple current cancellation by coupling two power sources in parallel and by providing the two power sources with switching frequencies that are 180° out of phase. The prior art system 20 illustrated in FIG. 6 provides for the cancellation of input ripple current in this manner. The system 20 includes a first boost-type power converter 21 (a first power source), which comprises a PWM controller 22, a FET power switch M1, an inductance L1, a rectifier D1, and a filter capacitor C1. The power converter 21 operates in a manner that is well-known, and will not be described further herein. The power supplied to the load 26 by the first power converter 21 is regulated by the feedback network 27 and the PWM controller 22, the output of which is coupled to the gate electrode of the FET power switch M1. A voltage divider formed by the resistors R3 and R4 of feedback network 27 divides the output voltage of the first power converter 21 and compares the divided output voltage against a reference voltage $V_{REF3}$ in the amplifier U6. The output voltage from the amplifier U6 is then coupled to the control input of the PWM controller 22 to regulate the ON time of the power switch M1.

The system 20 further includes a second boost-type power converter 23 (a second power source), which comprises a PWM controller 24, a FET power switch M2, an inductance L2, a rectifier D2, and a filter capacitor C2. The power converter 23 operates in a manner that is well-known, and will not be described further herein. The power supplied to the load 26 by the second power converter 23 is also regulated by the feedback network 27 and by the PWM controller 24, the output of which is coupled to the gate electrode of the FET power switch M2. The output voltage from the amplifier U6 is also coupled to the control input of the PWM controller 24 to regulate the ON time of the power switch M2.

As is well-known, the currents flowing through the inductors L1 and L2 in the power converters 21 and 23 respectively have triangular waveforms. A fixed-frequency oscillator 25 is directly coupled to the clock input of the PWM controller 22 and is coupled to the clock input of the PWM controller 24 through the inverter N2 to provide the PWM controllers 22 and 24 with clock waveforms that are 180° out of phase. As a result, the triangular current waveforms for the inductors L1 and L2 will be 180° out of phase. Therefore, the triangular component of the input current is cancelled, leaving only the DC component of the input current. The circuit of FIG. 6 does not address the problem of current or power equalization to the load 26. Further, since the components of the two power sources are not identical, slight phase differences naturally occur. Resulting in a ripple current large enough to prevent application of this circuit to a high power device.

It is known to combine variable frequency power sources for supplying power to a load, and to further use phase detection to equalize the currents supplied to a load by each of the power sources, and to cancel a ripple component of the input current drawn by the system.

Figure 7:
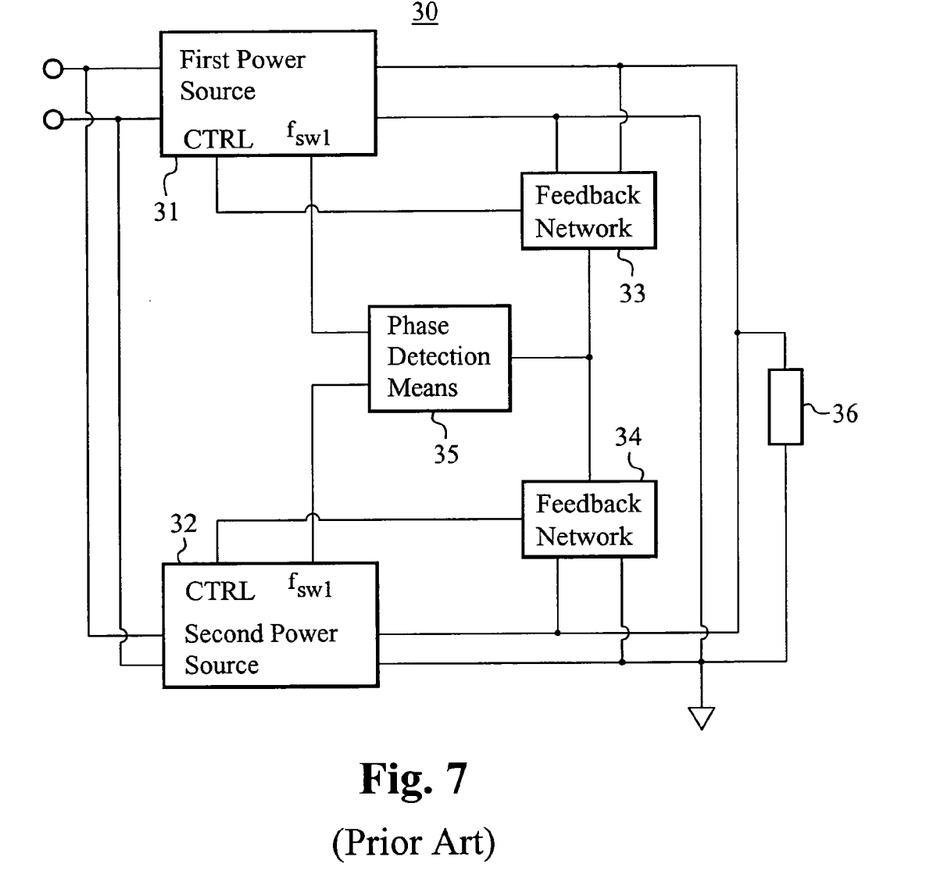
FIG. 7 shows a prior art power supply front-end for power factor correction using two parallel sources whose frequencies are equalized by a phase-locked loop.

FIG. 7 shows a block diagram that illustrates a system 30 for supplying power to the load 36. The system 30 includes first and second power sources 31 and 32 which are coupled together at their input terminals and supply power to the same load 36. Each of the power sources 31 and 32 is a variable-frequency power source that has a relationship between its switching frequency and the power that it supplies to a load. For example, each power source 31 and 32 can have a relationship between its switching frequency and the power that it supplies to a load that is either linear or non-linear. At the same time, each power supply can also have a relationship between its switching frequency and the power that it supplies to the load that is direct, so that power and switching frequency increase or decrease in the same direction, or inverse, so that power and switching frequency change in opposite directions. The power sources 31 and 32 of the system 30 have similar relationships between their switching frequencies and the power that they supply to the load 36. The first and second power sources 31 and 32 can be coupled to one another in parallel, as shown in FIG. 7.

Referring to FIG. 7, the system further includes feedback networks 33 and 34 associated with, respectively, the first and second power sources 31 and 32. The first feedback network 33 couples a portion of the output voltage of the first power source 31 to a control terminal CTRL of the first power source 31 to vary the first switching frequency $f_{sw1}$ of the first power source 31, thereby regulating the power supplied by the first power source 31 to the load 36. Similarly, the second feedback network 34 couples a portion of the output voltage of the second power source 32 to a control terminal CTRL of the second power source 32 to vary the second switching frequency $f_{sw2}$ of the second power source 32, thereby regulating the power supplied by the second power source 32 to the load 36.

The phase detection means 35 provides an error signal that is representative of the difference in phase between the first switching frequency $f_{sw1}$ of the first power source 31 and the second switching frequency $f_{sw2}$ of the second power source 32. The first switching frequency $f_{sw1}$ is coupled from a terminal of the first power source 31 and is applied to an input terminal of the phase detection means 35. Similarly, the second switching frequency $f_{sw2}$ is coupled from a terminal of the second power source 32 and is applied to the other input terminal of the phase detection means 35. The error signal provided by the phase detection means 35 is coupled to the feedback networks 33 and 34. The result is that the first and second switching frequencies $f_{sw1}$ and $f_{sw2}$ are locked to one another.

Furthermore, because the first and second power sources 31 and 32 have similar relationships between their switching frequencies and the power that they supply to a load, the power supplied to the load 36 by the first power source 31 is substantially equal to the power supplied to the load 36 by the second power source 32. In FIG. 7, the substantial equalization of the power supplied to the load 36 by the first and second power sources 31 and 32 means that the currents supplied to the load 36 by each of the power sources 31 and 32 are substantially equalized, because the power sources 31 and 32 are coupled to one another in parallel and, thus, apply the same voltage to the load 36.

The circuit of FIG. 7 utilizes a loop which is designed to lock the relative phase of the two power sources at 180° apart. Unfortunately, because the duty cycles of the two power sources are not always 50%, the phases are not always fully opposite. Furthermore, the device of FIG. 7 loses phase lock at the limits of the regulation loop, which results in a complete loss of input ripple current cancellation, and can result in audible noise emanating from the device.

SUMMARY OF THE INVENTION

The present invention relates to a system for and a method of using plural power sources to power a load where those power sources are arranged in a master-slave configuration wherein characteristics of the slave power source are modulated to produce output power with desired characteristics.

The present invention can be implemented with all types of critical conduction mode (CCM) converters, including buck, boost, buck-boost, flyback and forward converters for use in both AC/DC and DC/DC power converters and in insulated and non-insulated configurations.

In some applications, including power factor correction (PFC) front ends intended for use in power supplies with output power in excess of 300 watts, a power supply system with the following features is desired: good current sharing over the entire range of the input voltage, variable frequency operation, excellent input current ripple cancellation and minimal interference with input power system. The present invention provides a system with these desirable characteristics and with an improved simplicity and ease of manufacture. Further, the present invention avoids the use of bulky and inefficient components, such as sense resistors, present in many prior art devices.

The present invention is directed to a system for and a method of using multiple variable-frequency power sources to supply coherent power to a load. The system and method involve triggering the switch-on of a slave power source to the switch-off of a master power source, they further involve using a phase detector to adjust the switch-off of the slave power source for optimal power characteristics.

In another aspect, the present invention utilizes a local voltage controlled oscillator (VCO) in the triggering. In this embodiment, the switch-on of the master power source is locked to the VCO. The frequency is controlled to be the same frequency of the master power source. Further, the VCO has a symmetric output waveform. The slave power source is triggered to the falling edge of the VCO output, which is substantially 180° out of phase with the rising edge (which is in phase with the switch-on of the master power source). Hence, the switch-on of the slave power source will be substantially 180° out of phase with the switch-on of the master power source. This scheme minimizes both input and output ripple currents.

DETAILED DESCRIPTION OF A PREFERRED EMBODIMENT

Reference will now be made in detail to the preferred and alternative embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it should be noted that the present invention may be practiced without these specific details. In other instances, well known methods, procedures, components, and circuits have not been described in detail as not to unnecessarily obscure aspects of the present invention.

Figure 1:
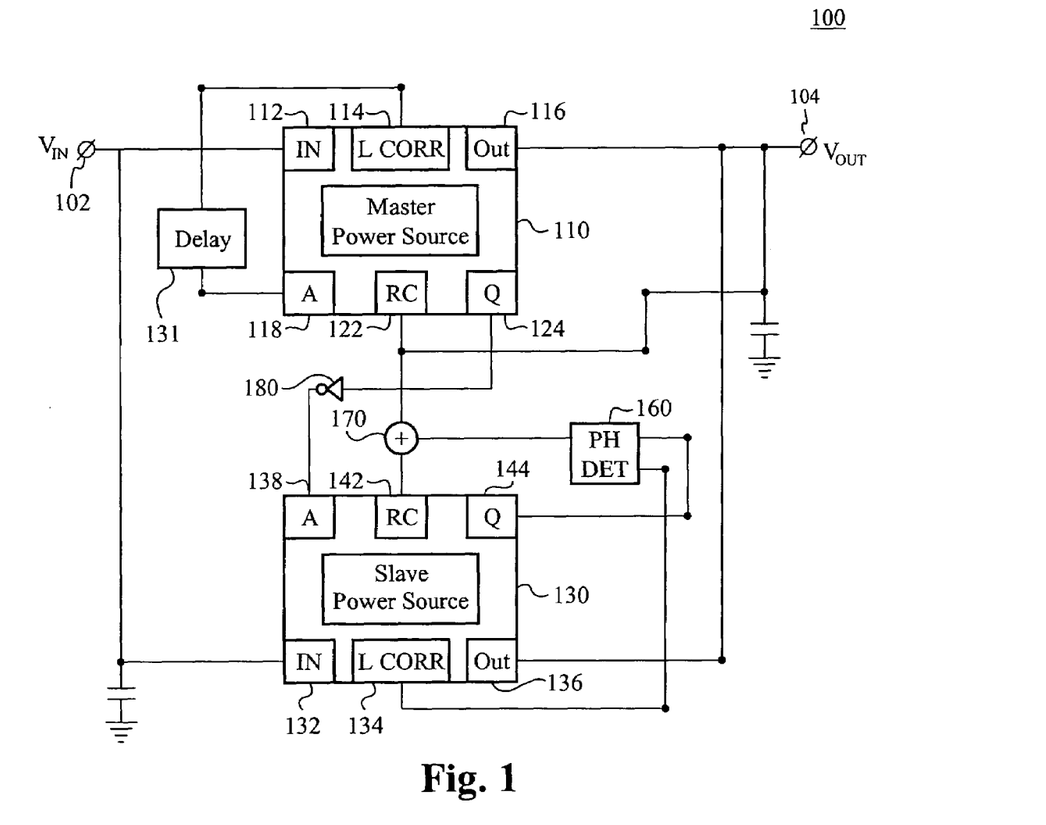
FIG. 1 is a block diagram of a system for supplying power to a load according to a feature of the present invention.

FIG. 1 is a block diagram illustration of a system 100 for supplying power to a load according to the present invention. This system includes two power sources, the master power source 110 and the slave power source 130. Each power source includes the following components, respective to the master 110 and slave 130: power inputs 112, 132; current sensor outputs 114, 134; power outputs 116, 136; internal monostable drives 118, 138; internal monostable delay drives 122, 142; and internal monostable outputs 124, 144. The master 110 is coupled to the slave 130 to provide conversion of power received at the input 102 of the system 100 to power supplied at the combined output 104 of the system 100 while providing minimal interference at both input 102 and combined output 104.

In the system 100, both the master 110 and the slave 130 are switched power supplies, as are known in the art, and hence only supply power to their outputs 116 and 136 when they are switched on. Both power supplies rely on internal monostables, which are not shown, to control internal switches, also not shown. The internal monostable drives 118, 138 determine the switching state by supplying a drive trigger. When a voltage is suppled to the internal monostable drives 118, 138 each monostable supplies a voltage to both the internal switch and to the internal monostable outputs 124, 144. The voltage supplied by the internal monostable persists according to a delay determined by the internal monostable delay circuit drives 122, 142. In the master 110 and the slave 130, the relationship between the switches and the monostable voltage supply is such that when the monostable supplies a voltage or is 'on', the switch is closed, this corresponds to the 'off' state of the power supply. However, the inclusion of the inverter 180 between the internal monostable output 124 of the master 110 and the internal monostable drive 138 of the slave 130 means that the internal monostable of the slave 130 is driven substantially out of phase with the internal monostable of the master 110. To summarize, the power supplies 110 and 130 are configured such that receipt of a signal by the drives 118, 138 will result in the power supply being switched off, and a voltage supplied to the outputs 124, 144 for a period of time determined by the delay circuit drives 122, 142.

While the master 110 is in the off configuration, power supplied to the input 112 is stored, when it is in the on configuration this power is supplied to the output 116 and subsequently to the combined output 104 and then a load, which is not shown. Simultaneously, the signal from the combined output 104 is coupled to the monostable delay circuit drive 122, where the current is stored to drive the delay means when the monostable is active. The master 110 is in a self resonant configuration: when current in the master 110 reaches zero, a signal from the current sensor output 114 is sent to the monostable drive 118. This signal is optionally fed through a delay mechanism 131 to take advantage of the natural resonant decay in current past the zero point. The monostable then supplies a voltage, switching off the master 110 and simultaneously supplying a voltage to the monostable output 124. The monostable supplies this voltage for a period of time according to the delay circuit 122. The delay circuit 122 is charged by the output power of the system 100.

The signal from the monostable output 124 is coupled to the monostable drive 138 of the slave 130 through the inverter 180. Hence, when the master 110 is switched to the off position, the slave 130 is subsequently switched to the on position. The slave 130 is configured to use a feedback mechanism to adjust the time it remains in the on position. The slave 130 remains in the on position for a time determined by the delay circuit 142. The delay circuit 142 is charged by a feedback loop which uses both the output power of the system 100, the monostable output 144 and the current sensor output 142. This feedback loop operates to cause the slave 130 to not switch off unless the current in the slave 130 is substantially close to zero. The signals from the monostable output 144 and the signal from the current sensor output 142 are compared within the phase detector 160. The output of the phase detector 160 is added to a current proportional to the output power of the system 100 and that combination is supplied to the delay circuit 142. The voltage output of the phase detector 160 represents a deviation from zero current present in the slave 130 at switch-off. This error signal provides negative feedback to modulate the duty cycle of the slave 130 so that the switch-off occurs at a time when substantially zero current is present in the slave 130.

The master 110 is in a self resonant configuration: having a switching state that is dependent on feedback from the combined output 104 and from its current sensor 114. The switching state of the slave 130 is controlled by the monostable output of the master 110, and by feedback from the combined output 104 adjusted by a correction derived from a comparison of the current sensor 134 to the monostable output 144. In this way the switching state of the slave 130 is inversely coupled to the state of the master 110 and the duty cycle of the slave 130 is optimized to fit that switching state.

Power supplied externally through the input 102 is coupled in parallel to the master 110 through the input 112 and to the slave 130 through the input 132, where it is stored. When the master 110 is in the on position, the slave 130 is in the off position. Power coupled to the input 112 and stored in the master 110 is supplied at the output 116 and subsequently to the combined output 104. Simultaneously power coupled to the slave 130 at the input 132 is stored in the slave 130, no power is supplied to the output 136. When the current within the master 110 reaches zero, a signal is coupled from the current sensor output 114 to the monostable drive 118, switching the master 110 to the off position, in which position it remains for a length of time determined by the delay circuit 122. Simultaneously, a signal is coupled from the monostable output 124 to the monostable drive 138, triggering the slave 130 to switch from the off position to the on position. The slave 130 remains in the on position for a length of time determined by the delay circuit 142. The length of the delay is modulated over the course of multiple switching cycles by a negative feedback mechanism wherein deviations from the optimal delay length result in adjustments to the power supplied to the delay length circuit 142. Meanwhile, the master 110 has remained in a switched off state according to the delay circuit 122. Since the delay circuits 122, 142 are powered by the same source, they can be configured in such a way that the switch-off of the slave 130 will be followed shortly by the switch-on of the master 110.

Figure 2:
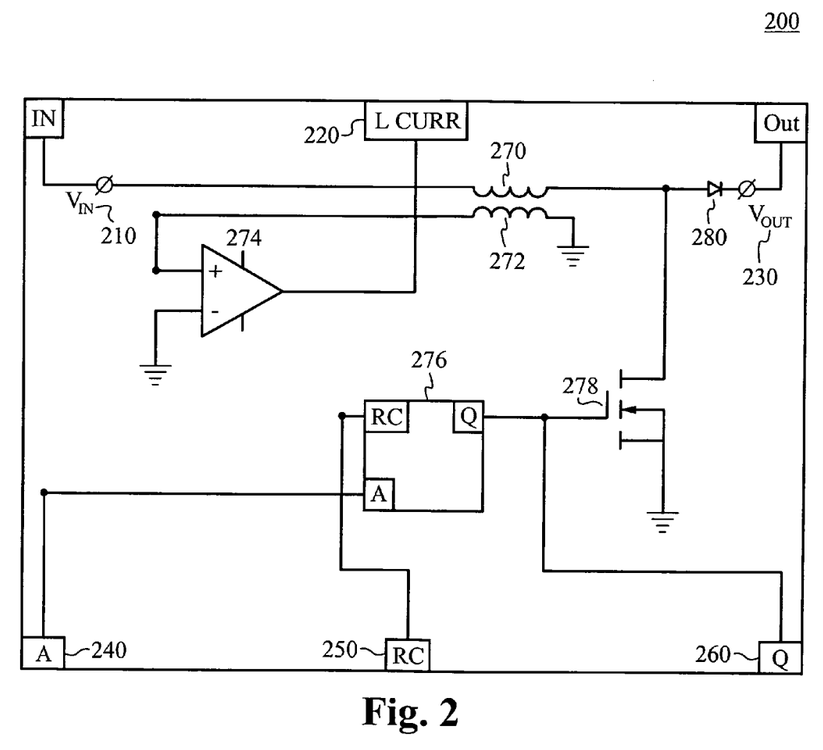
FIG. 2 further illustrates a component of the system of FIG. 1.

FIG. 2 is a functional block diagram of a power source 200 of the master 110 or the slave 130 of FIG. 1. The power source 200 includes a voltage input 210, a voltage output 230, a monostable 276, an op amp 274, a switch 278, an inductor 270, a diode 280, and an inductor 272. Voltage coupled to the voltage input 210 powers the inductor 270, inducing a sympathetic current in the inductor 272. If the switch 278 is open, and the current supplied is in the proper direction, current from the inductor 270 forward biases the diode 280 and travels through the voltage output 230. If the switch 278 is closed, current from the inductor 270 shorts to ground and the diode 280 is reverse biased.

The state of the switch 278 is determined by the Q output of the monostable 276. The Q output can assume two states and is in one state by default, when the monostable receives a voltage on the A input, it pushes the Q output to the second state where it remains for a time determined by the RC input of the monostable. The A input and the RC input to the monostable 276 are respectively determined by the inputs 240 and 250 of the power source 200. The Q output of the monostable is supplied as the output 260 of the power source 200.

The sympathetic current induced in the inductor 272 is coupled as one input to the op amp 274, the other input to the op amp 274 being grounded. The output of the op amp 274 is coupled as the output 220 of the power source 200.

Figure 3:
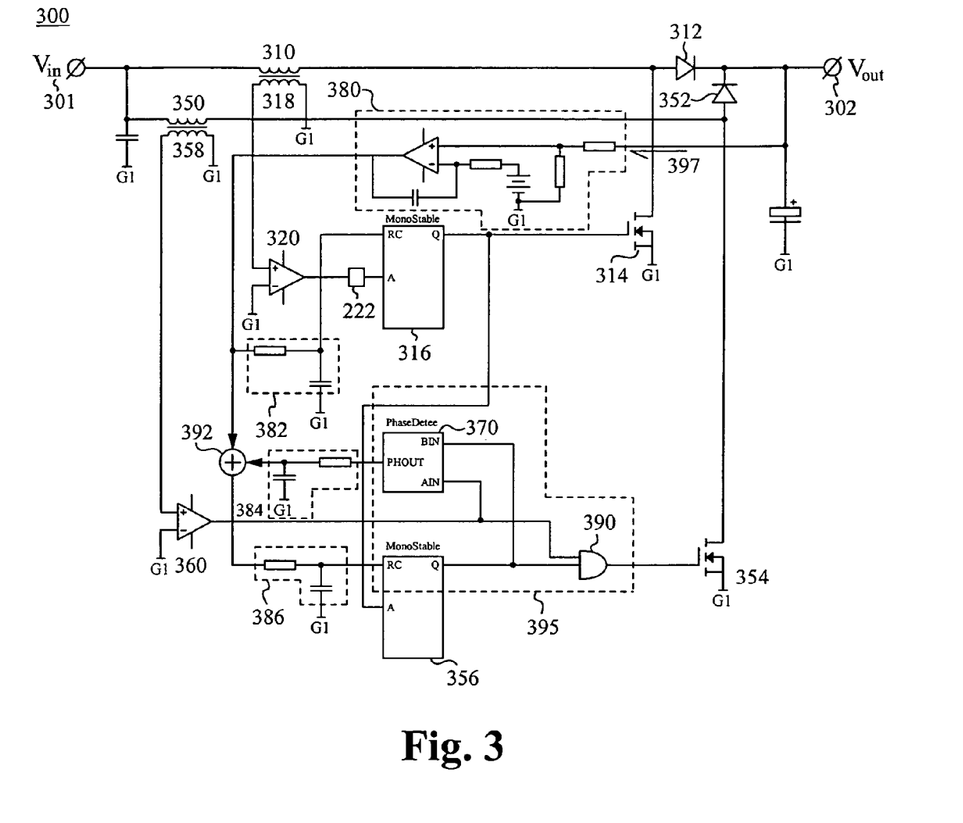
FIG. 3 shows a functional diagram of an alternate embodiment of the present invention.

FIG. 3 is a functional block diagram of an alternative embodiment of the present invention. The operation of the system 300 of FIG. 3 is substantially similar to that of the system 100 of FIG. 1. The system 300 is coupled to receive power at the input 301 and supplies power at the output 302. A power signal from the input 301 is coupled to parallel power sources, one a master and one a slave.

The power signal is coupled to the inductor 310 wherein it induces a sympathetic current in the inductor 318. The signal takes one of two paths from the inductor 310, depending on the state of the switch 314: if the switch is open, the signal passes through the diode 312 and subsequently to the output 302; if the switch is closed the signal will travel to ground through the switch 314. From the inductor 318, the induced signal is supplied as one input the op amp 320. The other input of the amp 320 is shorted to ground. The output of the op amp 320 is coupled through a delay device 322 to the triggering input A of the monostable 316.

The power signal is also coupled to the slave. The power signal is coupled to the inductor 350 wherein it induces a sympathetic current in the inductor 358. The signal takes one of two paths from the inductor 350, depending on the state of the switch 354: if the switch is open, the signal passes through the diode 352 and subsequently travel to the output 302; if the switch is closed the signal will travel to ground through the switch 354. From the inductor 358, the induced signal is coupled as one input the op amp 360. The other input of the op amp 360 is coupled to ground. The output of the op amp 360 is coupled to a feedback network 395 that controls the slave. The operation of the network 395 will be discussed below following a more thorough description of the operation of the monostables 316, 356 and of the master.

Each of the monostables 316, 356 has an output Q, and two inputs A and RC. The output Q can assume two states, one is stable and one is floating. A transition from the stable state to the floating state occurs when the monostable receives a signal on the input A, the duration for which the output Q remains in the floating state is determined by the input RC. When the input RC is shorted to ground, the state of the output Q switches back to the stable state. In the system 300, the ubiquitous method of timing this transition is to connect a network of a resistor and a capacitor to the RC input. When the output Q is in the floating state, power stored in the capacitor is dissipated across the resistor until the RC input is shorted to ground, thus determining the time that the output Q is in the floating state.

The combined output of the master and slave, while being supplied to the output 302 is also supplied as a feedback signal 397 to the master and slave. The feedback signal 397 passes through the filter 380 and subsequently through both the filter 382 and the adder 392. The output of the filter 382 is coupled to the input RC of the monostable 316. Thus, the duration of residence in the floating state is determined in the monostable 316 by the filter 382. The monostable 316 drives the state of the switch 314 through the output Q. The state of the output Q, and hence the switch 314 is determined by the monostable 316. Simultaneously, the signal from the output Q is provided to the input A of the monostable 356 of the slave.

Due to the specifics of the switches 314, 354 the coupling of the output Q of the monostable 316 to the input A of the monostable 356 results in this effect: closing the switch 314 subsequently results in the opening of the switch 354. Hence, the switch-on of the slave is triggered by the switch-off of the master. However, the actual duty cycles of the slave and master are not mirror images and hence do not result in complete cancellation of the input and output ripple currents. Furthermore, the feedback mechanisms that determine the switching cycles have correction factors which result in the modulation of these duty cycles. These feedback mechanisms will now be described in detail.

The feedback network 395 of the slave determines the proper signals to supply to inputs A and RC of the monostable 356 based on the output of the op amp 360 and the output Q of the monostable 356. Further, the network 395 controls the signal to the switch 354 from the output Q of the monostable 356 and the output of the op amp 360. The feedback network 395 performs two separate operations on the inputs from the op amp 360 and from the monostable 356, these two operations result in two separate outputs.

To form the first output, the feedback network 395 compares the phase between the output Q of the monostable 356 against the output of the op amp 360. The output Q causes the monostable 356 to effect a switching event in the slave, the output of the op amp 360 represents an amount of current present in the slave. The phase comparison computes a signal representative of the deviation in the desired switching time from the optimal switching time at which the current in the slave is substantially zero.

The second output is the result of a operation performed by an AND gate 390 on the output Q of the monostable 356 and the output of the op amp 360. This operation produces an output that will not trigger a switching event unless the current in the slave is substantially less than or equal to zero.

The first output signal of the feedback network 395 is passed through a filter 384 to the adder 392. The adder 392 combines this first output with the feedback signal 397. The output of this adder is supplied to the filter 386 and subsequently to the input RC of the monostable 356.

Thus, the transition to the floating state of the output Q of the monostable 356 is determined by a signal from the output Q of the monostable 316 and the duration for which the floating state persists is determined by a signal determined by the feedback signal 397 and the first output of the feedback network 395.

The second output signal of the feedback network 395 is coupled to control the switch 354 of the slave. The switching state of the slave is determined by the output Q of the monostable 356 combined in a logical AND gate 390 with the output of the op amp 360. Thus, no switching event is triggered unless the current in the slave is substantially less than or equal to zero.

The effect of the feedback network 395 is to provide a correction to the desired switching time of the slave. As discussed above, this desired switching time is triggered directly from the switch-off of the master. However, without the feedback network 395 it is possible for the switch 354 to be closed with an unacceptable level of current in the slave inductor 350. This could result in damage to the switch 354. The feedback network 395 provides two functions: first, it prevents the switch 354 from ever closing with an unacceptable current level; and, second, it provides a correction to the duty cycle of the slave, pushing it towards a point where its switch-off event will occur at an optimal time as regards current in the slave.

Figure 4:
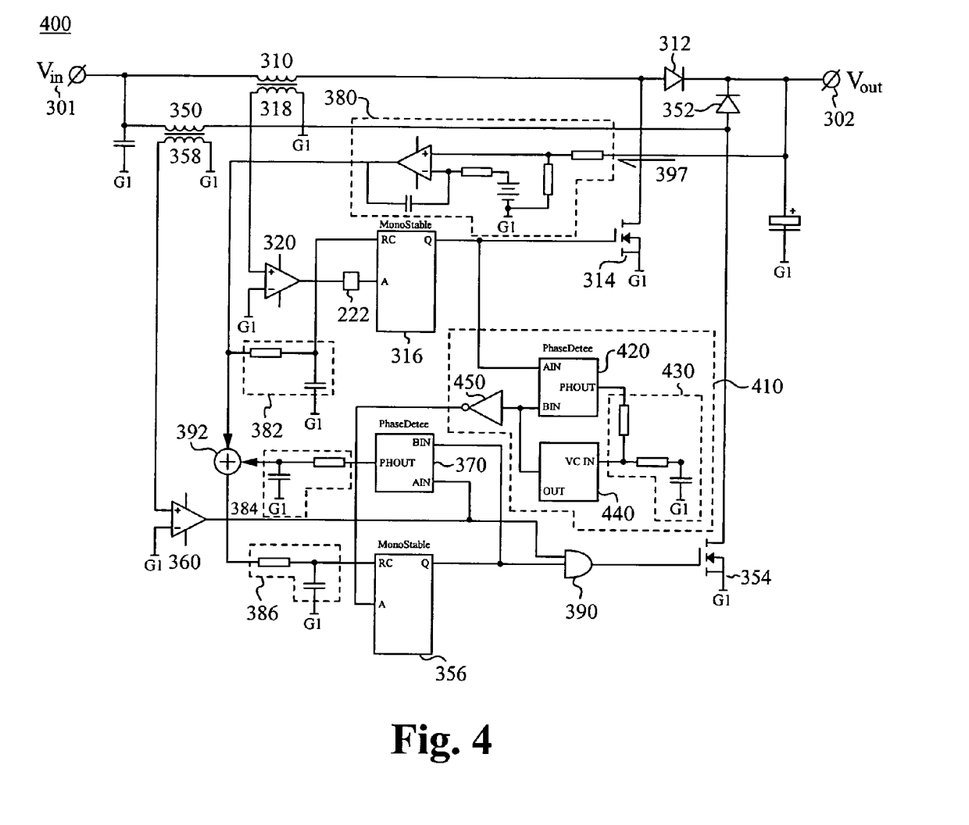
FIG. 4 shows a functional diagram of the preferred embodiment of the present invention.

FIG. 4 is a functional diagram of a system 400 of the preferred embodiment of the present invention. The system 400 is the same as the system 300 of FIG. 3, but with the addition of the oscillator circuit 410 between the output Q of the monostable 316 and the input A of the monostable 356.

The oscillator circuit 410 includes a voltage controlled oscillator 440 with a duty cycle of 50% to produce a triggering signal which is sent to the input A of the monostable 356. The control signal coupled to the oscillator 440 is modulated so that the frequency of the oscillator 440 is substantially the same as the frequency of the output Q of the monostable 316. Furthermore, the signal from the oscillator 440 is substantially in phase with the signal of the output Q of the monostable 316, as it is triggered off the leading edge of that signal. This signal is inverted and coupled to the input A of the monostable 356 so that the resultant output Q of the monostable 356 is substantially 180° out of phase with the output Q of the monostable 316.

In the oscillator circuit 410 output Q of the monostable 316 is coupled to a phase detector 420 wherein it is compared with the output of a voltage controlled oscillator 440. The resultant output of the phase detector 420 is proportional to the error between the two input signals. This input is coupled to a voltage divider 430 and subsequently to the oscillator 440. The result is a feedback network that drives the output signal of the oscillator to be in phase with the leading edge of the output Q of the monostable 316. Hence the frequencies of the oscillator 440 and the output Q of the monostable 316 are substantially the same. The output of the oscillator 440 is also inverted by the inverter 450 and coupled to the input A of the monostable 356. This operation effectively triggers the monostable 356 at a point 180° out of phase with the signal of the output Q of the monostable 316.

Due to the specifics of the switches 314, 354 the 180° phase difference in the signals on the outputs Q of the monostables 316, 356 results in this effect: closing the switch 314 subsequently results in the opening of the switch 354. Hence, the switch-on of the slave is triggered by the switch-off of the master.

As compared to the system 300, the system 400 results in a more optimal input and output current ripple cancellation. As discussed above, there are incongruities between the master and slave sources. In order to not damage circuit components, the duty cycles of the master and slave cannot necessarily be mirror images of one another. Thus, the master and slave signals cannot perfectly cancel the ripple components of one another.

The local oscillator system 400 provides a constant correction to the duty cycles of the master and slave, driving them towards a state in which they are each 50% and are 180° out of phase. The correction allows for optimal cancellation. In contrast, the system 300 has no such correction. Accordingly, the system 400 has enhanced ripple cancellation over the system 300.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

What is claimed is:

1. A system for supplying power to a load, the system comprising:
   a. a first and a second power source, each having a control system;
   b. means for detecting a switch-off event in the first power source and subsequently triggering a switch-on event in the second power source, the means comprising means for directly supplying a first signal to both a switch of the first power source and to the control system of the second power source; and
   c. a feedback mechanism configured to monitor a switching state of the second power source and to continuously adjust a duty cycle of the second power source according to the switching state, wherein the feedback mechanism is further configured to trigger a switch-off event in the second power source when a residual power supply current within the second power source is substantially equal to zero,
   wherein the first and second power source have similar noise characteristics.

2. The system of claim 1, wherein the first power source has a switching waveform comprising a frequency and a duty cycle, further wherein the duty cycle is modulated by a first feedback system taking inputs comprising a signal proportional to the power supplied by the system, further wherein the frequency is determined by a second feedback system taking inputs comprising a signal proportional to a power supply current present in the first power source.

3. The system of claim 2, wherein the second feedback system comprises means for detecting the absence of the power supply current in the first power source and subsequently signaling the control system of the first power source to trigger the switch-off event of the first power source.

4. The system of claim 3, wherein the subsequent signaling of the control system comprises means for delaying the signaling to take advantage of a known oscillatory behavior of the power supply current in the first power source so that a voltage across a switching element of the first power source is minimized.

5. The system of claim 1, wherein the second power source has a switching waveform comprising a frequency and a duty cycle, wherein the frequency is determined by the triggering of a switch-on event in the second power source, further wherein the duty cycle is modulated by a third feedback system taking inputs comprising a signal proportional to a power supply current present in the second power source, a signal proportional to the power supplied by the system, and a desired switching event.

6. The system of claim 5, wherein the desired switching event is indirectly triggered by the switch-off event in the first power source.

7. The system of claim 6, wherein the third feedback system is configured to determine a difference between the desired switching event and the power supply current in the second power source, wherein the control system uses a signal representative of the difference to continuously adjust the duty cycle of the second power source.

8. A system for supplying power to a load, the system comprising:
   a. a first and a second power source, each having a control system; and,
   b. means for detecting a switch-off event in the first power source and subsequently triggering a switch-on event in the second power source, wherein the means for detecting comprises means for directly supplying a first signal to both a switch of the first power source and to an oscillator circuit coupled between the first power source and the second power source responsible for then supplying a control signal to the control system of the second power source, wherein the oscillator circuit includes a voltage controlled oscillator configured to receive the first signal from the first power source and to generate the control signal such that a frequency of the control signal is equal to a frequency of the first signal;
   wherein the first and second power source have similar noise characteristics.

9. The system of claim 8, wherein the control signal has a waveform with substantially the same frequency as a waveform of the first power source, also substantially 180° out of phase with the first power source, and with a duty cycle that is substantially 50%.

10. The system of claim 8, wherein the first power source has a switching waveform comprising a frequency and a duty cycle, further wherein the duty cycle is modulated by a first feedback system taking inputs comprising a signal proportional to the power supplied by the system, further wherein the frequency is determined by a second feedback system taking inputs comprising a signal proportional to a power supply current present in the first power source.

11. The system of claim 10, wherein the second feedback system comprises means for detecting the absence of the power supply current in the first power source and subsequently signaling the control system of the first power source to trigger the switch-off event of the first power source.

12. The system of claim 11 wherein the subsequent signaling of the control system comprises means for delaying the signaling to take advantage of a known oscillatory behavior of the power supply current in the first power source so that a voltage across a switching element of the first power source is minimized.

13. The system of claim 8 wherein the second power source has a switching waveform comprising a frequency and a duty cycle wherein the frequency is determined by the triggering of a switch-on event in the second power source, further wherein the duty cycle is modulated by a third feedback system taking inputs comprising a signal proportional to a power supply current present in the second power source, a signal proportional to the power supplied by the system, and a desired switching event.

14. The system of claim 13, wherein the desired switching event is indirectly triggered by the switch-off event in the first power source.

15. The system of claim 14, wherein the third feedback system is configured to determine a difference between the desired switching event and a power supply current in the second power source, wherein the control system uses a signal representative of the difference to continuously adjust the duty cycle of the second power source.

16. The system of claim 14, wherein the third feedback system further comprises means for preventing switching from occurring when the power supply current in the second power supply is greater than zero.

17. A system for providing power factor correction to a power supply, the system comprising:
   a. first and second power sources, wherein each power source has a similar relationship between the power supplied by the power source and the switching frequency of the power source, further wherein each power source has similar characteristic noise in the output of the power source;

b. means for detecting a switch-off event in the first power source and subsequently generating a first signal with a first frequency for triggering a switch-on event in the second power source;

c. means for modulating the duty cycle of the second power source according to present characteristics of the second power source; and d. an oscillating circuit including a voltage controlled oscillator configured to receive the first signal and to generate a control signal with a second frequency for triggering the switch-on event in the second power source, wherein the first frequency is equal to the second frequency.

18. The system of claim 17, wherein the means for detecting comprises means for directly supplying the first signal to both a switch of the first power source and to the oscillating circuit.

19. The system of claim 18, wherein the first power source has a switching waveform comprising a frequency and a duty cycle further wherein the duty cycle is modulated by a first feedback system taking inputs comprising a signal proportional to the power supplied by the system, further wherein the frequency is determined by a second feedback system taking inputs comprising a signal proportional to a power supply current present in the first power source.

20. The system of claim 19, wherein the second feedback system comprises means for detecting the absence of the power supply current in the first power source and subsequently signaling the control system of the first power source to trigger the switch-off event of the first power source.

21. The system of claim 20, wherein the subsequent signaling of the control system comprises means for delaying the signaling to take advantage of a known oscillatory behavior of the power supply current in the first power source so that a voltage across a switching element of the first power source is minimized.

22. The system of claim 18, wherein the second power source has a switching waveform comprising a frequency and a duty cycle, wherein the frequency is determined by the triggering of a switch-on event in the second power source, further the means for modulating the duty cycle of the second power source is a third feedback system taking inputs comprising a signal proportional to a power supply current present in the second power source, a signal proportional to the power supplied by the system, and a desired switching event.

23. The system of claim 22, wherein the desired switching event is indirectly triggered by the switch-off event in the first power source.

24. The system of claim 23 wherein, the third feedback system is configured to determine a difference between the desired switching event and a power supply current in the second power source, wherein the control system uses a signal representative of the difference to continuously modulate the duty cycle of the second power source.

25. The system of claim 24, wherein the control system has a waveform with substantially the same frequency as a waveform of the first power source, also substantially 180° out of phase with the first power source, and with a duty cycle that is substantially 50%.

26. The system of claim 24, wherein the third feedback system further comprises means for preventing switching from occurring when the power supply current in the second power source is greater than zero.

27. A method for providing power factor correction to a power supply, the method comprising:

a. coupling a first and a second power source so that both power sources receive power from the same source and output power to the same load; wherein the first power source has a first switching cycle and the second power source has a second switching cycle;

b. configuring the first power source to be self-resonant such that the first power source determines a switching frequency of the first switching cycle;

c. configuring the second power source to switch-on when the first power source switches off, whereby the second switching cycle of the second power source has a switching frequency approximately equal to the switching frequency of the first power source; and, d. modulating a duty cycle of the second power source so that a switch-off event of the second power source occurs when a power supply current within the second power source is substantially equal to zero.

28. A method for providing power factor correction to a power supply, the method comprising:

a. coupling a first and a second power source so that both power sources receive power from the same source and output power to the same load; wherein both power sources have a switching cycle;

b. configuring the first power source in a self-resonant way such that it determines a switching frequency for its own switching cycle;

c. configuring a local oscillator to produce a waveform with a duty cycle of approximately 50% at a frequency equal to the switching frequency of the first power source and further in phase alignment with the switching frequency of the first power source;

d. configuring the second power source to operate at a switching frequency approximately 180° out of phase with the waveform produced by the local oscillator, whereby the switching cycle of the second power source has a switching frequency approximately equal to the switching frequency of the first power source and approximately 180° out of phase with the switching frequency of the first power source; and, e. modulating a duty cycle of the second power source so that the switch-off event of the second power source occurs at an optimal time relative to a current that exists in the second power source.

* * * * *